United States Patent [19]

Coles

[11] Patent Number: 4,707,128
[45] Date of Patent: Nov. 17, 1987

[54] TURBID MEDIA VIEWING SYSTEM

[75] Inventor: Bryan W. Coles, San Diego, Calif.

[73] Assignee: Subsea Engineering Associates, Inc., San Diego, Calif.

[21] Appl. No.: 687,989

[22] Filed: Dec. 31, 1984

[51] Int. Cl.$^4$ .............................................. G01C 3/08
[52] U.S. Cl. .......................................... 356/4; 356/5
[58] Field of Search ..................... 356/5, 1, 4; 354/403

[56] References Cited

U.S. PATENT DOCUMENTS

| | | | |
|---|---|---|---|
| 3,781,111 | 12/1973 | Fletcher et al. | 356/5 |
| 4,121,889 | 10/1978 | Söderström | 356/5 |
| 4,195,311 | 3/1980 | Moran | 356/5 |
| 4,209,252 | 6/1980 | Arditty et al. | 356/4 |
| 4,289,397 | 9/1981 | Itzkan et al. | 356/5 |
| 4,518,254 | 5/1985 | Penny et al. | 356/4 |

OTHER PUBLICATIONS

"Underwater Viewing System for Use in Murky Water", Technical Proposed by Trident Corporation; 99 First St., Cambridge, Mass.; 1960.
"Laser TV Camera", Perkin-Elmer Press Release, Electronics Review; vol. 38, No. 24, pp. 29-30, Nov., 1965.
Ralph McManus, Arthur Chabot, "Scan Sychonrized Receiver Optimises Laser Ranging", Laser Focus, Oct. 1966; pp. 19-23.
N. E. Johnson, "Laser System for Underwater Observation", Research Development; vol. 19, No. 4, Apr. 1968.
E. Kornstein and H. Wetzstein, "Blue-Green High–Powered Light Extends Underwarer Visibility", Electronics; vol. 41, pp. 140-149 (68).
W. F. Matthews and R. F. Jung, "Laser Line-Scanning Sensors", SPIE Journal; vol. 14, No. 2; Mar./Apr. 1975, p. 116.
R. E. Hopkins, M. J. Buzawa, "Optics for Laser Scanning", Optical Engineering, vol. 15, No. 2, p. 90, 1976.
M. Green, "Limiting Range of Detection Throught Water in Mearly Coaxial Optical Transmitter-Receiver System", Optical Engineering, vol. 16, No. 2, Mar.-Apr. 1977.
P. J. Heckman, P. D. McCardell, "A Real-Time Optical Mapping System", Proceedings of the Society of Phot-Optical Instrumentational Engineer, vol. 160, pp. 189-196, 1978.

Primary Examiner—Stephen C. Buczinski
Assistant Examiner—Melissa L. Koltak
Attorney, Agent, or Firm—Brown, Martin, Haller & Meador

[57] ABSTRACT

A coaxial, spacially gated, range gated, pulsed-beam, scanning system for use in turbid media, such as seawater, fog, snow, rain, blowing dust or sand. A laser emits a pulsed beam of light which travels to a beam splitter where part of the beam is transmitted and part is deflected. The transmitted beam is then deflected by an x-y scanning element such that a target is sequentially illuminated in a point-by-point manner. Light refected from the target travels back along the same path as the transmitted beam and is deflected by the beam splitter to a light sensor, such as photomultiplier tube. The field-of-view of the light sensor is limited and controlled in such a manner that it receives light only from that portion of the target that is illuminated by the portion of the transmitted beam light that has not been scattered by the turbid medium, and the system is range gated to accept only that portion of the output of the light sensor which is representative of the intensity of the non-scattered beam pulse which is reflected by the target. Range gatting may be triggered by detection of the leading edge of the reflected light pulse as it enters the sensor or by detection of the portion of the emitted beam that is deflected by the beam splitter. This allows use of a free-running laser.

19 Claims, 1 Drawing Figure

TURBID MEDIA VIEWING SYSTEM

FIELD OF THE INVENTION

This invention relates in general to a viewing system for use in turbid media such as seawater, and more specifically involves a coaxial, range-gated, pulsed-beam scanning system.

BACKGROUND OF THE INVENTION

Specialized viewing systems can greatly enhance the observation of objects in turbid media. For example, such systems are useful in seawater for salvage and recovery operations or for target detection. Such a system could also be used to allow aircraft or ships to navigate in fog or other adverse weather conditions.

Turbid media viewing systems are designed to avoid the deleterious effects of scattering, that is, to separate information containing light from non-information containing light. Conventionally, a method of accomplishing this is to separate the light source from the receiver. The greater the separation, the less scattered light is detected by the receiver. Usually, the source and receiver are as far apart as is permitted by the size of vehicle upon which they are mounted.

Another method of avoiding the effects of scatter is range gating. In range gating, a pulsed light source is used and the receiver is activated only upon receiving the light pulse that is reflected from the target.

In another method, synchronous scanning, a very narrow source beam illuminates a small portion of the target and scans the target. The receiver has a very narrow field of view and is synchronized to follow the scanning source. This technique minimizes the volume of illuminated water that is in the field of view of the sensor at a given time and thereby enhances the signal-to-noise ratio which improves performance of the system.

There are a number of disadvantages to these prior art methods or combinations thereof. Conventional range-gated techniques illuminate the entire target with a single pulse. The light is spread over the entire target and an extremely intense, high power pulse is therefore required to illuminate any target that is a substantial distance from the system.

In conventional scanning systems, extremely sophisticated and complex mechanical synchronization techniques are required to keep the small field of view of the receiver coincident with the small illuminating spot as it scans the target.

Therefore, it is desirable to have a system for use in turbid media that reduces the need for very high power light pulses and eliminates the mechanical synchronization problems between source and receiver while retaining the benefits of both range gating and spatial gating.

SUMMARY OF THE INVENTION

This invention is a viewing system designed specifically for use in turbid media such as seawater. According to the invention, an emitter, such as a pulsed laser, emits a short pulse of light which travels to a beam splitter where part of the light is transmitted and part is deflected. The transmitted portion of the pulse passes through optics and is deflected by an x-y scanning element in such a manner that a portion of a target is illuminated in a point-by-point manner. Light reflected from the target travels back along a path that is coaxial with the path of the transmitted pulse, striking the scanning elements and the beam splitter. The return light deflected by the beam splitter is received by a light sensor, such as a photomultiplier tube.

A sample/hold module receives the output signal from the light sensor and periodically samples the signal. To eliminate most of the signal due to scattered light, the sample/hold module is activated to sample and retain only the output of the detector that is due to the directly reflected pulse. This is accomplished by triggering the sample/hold module off of the laser pulse generator after an appropriate delay determined by the range to the target.

According to the precept of the invention, the sample/hold module may be triggered by sampling a portion of the outgoing pulse and monitoring the time at which a pulse leaves the laser. The sample/hold module may also be triggered by detecting the leading edge of the reflected pulse.

The output signal from the sample/hold is therefore proportional to the local reflectance of the target and, by synchronization with the scanning element drive signal, can be displayed on a cathode ray tube or other appropriate display device in such a way that the intensity of the display is proportional to the reflectance of the target.

Other features and many attendant advantages of the invention will become more apparent upon a reading of the following detailed description together with the accompanying drawing.

DETAILED DESCRIPTION OF THE DRAWING

Figure 1:
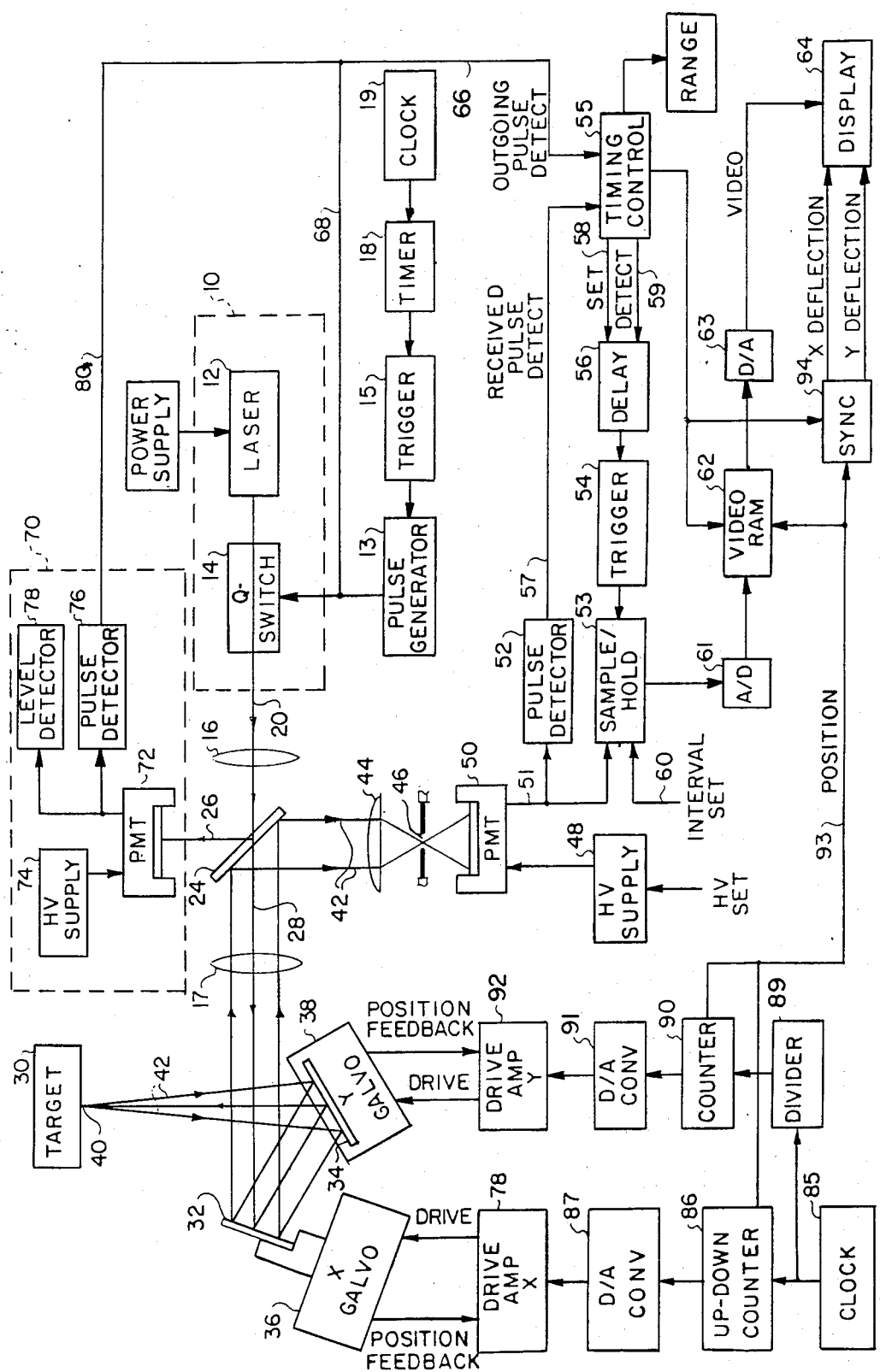
FIG. 1 is a diagrammatic view of the system of the present invention.

With reference now to the drawing, there is shown a diagrammatic view of a preferred embodiment of the turbid media imaging system of the present invention. An overview of the system's components and functioning follows. Following that is a more detailed description of the system in operation.

Emitter 10 emits a pulse of light 20 which travels through emitter focusing optics 16 to a beam splitter 24 where part of the beam is transmitted 28 and part is deflected 26. Small mirrors, x-axis mirror 32 and y-axis mirror 34, direct the transmitted pulse 28 towards a target 30 where it illuminates a small area 40 of the target 30. Light 42 reflected from the target area 40 travels back along a path coaxial with the transmitted pulse 28, striking y-axis mirror 34 and x-axis mirror 32 to be deflected by the beam splitter 24. The light deflected by the beam splitter passes through detector focusing optics 44 and through "field stop" aperture 46 to detector 50.

The system is now described in greater detail and in operation.

The emitter 10 emits a pulse 20 of light. The emitter 10 must produce very short pulses of light to overcome the deleterious effects of scattering. A pulse duration in the range of five nanoseconds is desirable. Also, the light must be intense enough to ensure that a measurable amount of light is reflected by the target 30 and received by the detector 50. In the exemplary embodiment of FIG. 1, the emitter 10 is comprised of a laser 12 and a pulse generating means such as a Q-switch 14. The laser 12 emits a narrow, highly collimated beam of light and may be rapidly pulsed. For viewing in seawater, a preferred laser 12 emits a beam in the wavelength range of 430 nanometers to 540 nanometers, the bandwidth of maximum transmission (minimum absorption) in seawater. Lasers especially applicable for viewing in seawater include argon ion lasers, frequency doubled Nd:YAG lasers (neodymium:yttrium aluminum garnet), and copper vapor lasers. These lasers are quite expensive. However, due to the superior performance of the present invention, a less effective, but much less expensive laser, such as a helium neon laser may be used in many situations. Also, the present invention does not require the use of a laser, and another source of light would work even though it is not highly collimated.

A pulsing circuit connected to the Q-switch 14 determines the pulse duration of the beam 20. The pulsing circuit is comprised of a pulse generator 13, generator trigger 15, timer 18, and clock 19. The signal from the clock 19 feeds into the timer 18 of counting the clock pulses. Timer 18 activates generator trigger 15 which triggers the pulse generator 13 for activating the Q-switch 14. As will be explained below, the emitter 10 may be a free-running laser, in which case it is not necessary to switch the laser via an external timer.

The pulse beam 20 travels from the emitter 10 to a beam splitter 24. Alternatively, instead of a beam splitter 24, a mirror with an orifice for passage therethrough of the emitted pulse 20 could be used. However, the deflected pulse 26 from the beam splitter 24 may be used for purposes described below. The transmitted pulse 28 passes through second focusing optics 17 and is directed by mirrors, x-axis mirror 32 and y-axis mirror 34, toward a target 30. The x-axis mirror 32 and y-axis mirror 34 are mounted on the shafts of x-axis galvanometer 36 and y-axis galvanometer 38, respectively. The galvanometers 36 and 38 are mounted such that their shafts are at right angles to one another to provide for scanning in two perpendicular axes. The x-axis mirror 32 and y-axis mirror 34 are moved in such a manner that either a portion of the target 30 or the entire target is sequentially illuminated in a point-by-point manner. A driving circuit for the x-axis galvanometer 36 consists of a clock 85 for outputting clock timing signals to an up-down counter 86. The up-down counter 86 supplies a signal to a digital-to-analog converter 87 after a predetermined number of clock pulses for sending an analog drive signal to x-axis drive amplifier 88 which positions the x-axis galvanometer 36. Output from the clock 85 also is used to drive the y-axis galvanometer 38. The clock 85 output passes to a divider 89 which determines the width of the scan. The output of the divider passes to counter 90, which determines when the scan is restarted, and hence to a digital-to-analog converter 91 for outputting an analog drive signal to the y-axis drive amplifier 92 which drives the y-axis galvanometer 38. In an alternative embodiment, the mirrors may be a plurality of mirrors mounted on rotating shafts whereby the scanning is achieved by varying the rotational speed of the shafts. Although in the exemplary embodiment of FIG. 1, an x-y deflection system is used to generally illuminate a rectangular portion of the target, the viewing system of the present invention is adaptable to many types of deflection systems well-known in the art. Transmitted pulse 28 propagates to illuminate a small area 40 of the target 30. Return light 42, reflected from the small area 40, travels as an expanding wavefront back along a path coaxial with the transmitted pulse 28, is reflected from y-axis mirror 34 and x-axis mirror 32, and passes through second focusing optics 17 to the beam splitter 24. The return light 42 that is reflected by the beam splitter 24 passes through detector focusing optics 44 and field stop 46 to detector 50. The illuminated area 40 of the target 30 is the optical conjugate of the field stop aperture 46. In the exemplary embodiment, the detector 50 is a photomultiplier tube. Adjustable high-voltage supply 48 furnishes power to detector 50. Pulse detector 52 and sample/hold module 53 are coupled to the detector output 51. Sample/hold trigger 54 activates the sample/hold module 53. Timing and control module 55 provides timing and logic for the ranging and viewing portions of the system.

To avoid sampling the portion of the detector output signal 51 which is due to scattered light and other noise, the sample/hold module 53 must be triggered at the appropriate moment when the reflected light 42 from the illuminated area 40 of the target 30 enters the detector 50. To accomplish this, the time required for emitted pulse 20 to travel to target 30 and return to detector 50 must be known. If the range to the target 30 is known, then this time interval is easily calculated. Conversely, if the time interval is known, then the range to the target can be determined. The timing/control module 55 receives a received pulse detect signal on line 57 from pulse detector 52 and an outgoing pulse detect signal on line 66. Outgoing pulse detect line 66 from line 68 is coupled to the Q-switch activation line 68 from pulse generator 13. Alternatively, the moment of the outgoing pulse 20 may be determined by the detection of the deflected pulse 26 from the beam splitter 24 by an outgoing pulse detection circuit 70. The outgoing pulse detection circuit 70 consists of a light detector, such as photomultiplier tube 72. High voltage source 74 furnishes power to the photomultiplier tube 72. Pulse detector 76 and level detector 78, connected to the output of the photomultiplier tube 72, detect the reception of deflected light pulse 26. Line 80 conveys this deflected outgoing pulse detect signal to outgoing pulse detect line 66 and hence to the timing/control module 55. By use of this alternative outgoing pulse detection circuit 70, it is possible to use a free-running laser as an emitter 10. From the time interval between outgoing pulse detect signal on line 56 and receive pulse detect signal on line 57, the timing/control module 55 can determine and output the range to the target 30. The timing and control module 55 also uses this information to set delay 56 via set line 58. Ranging is a continuous function and the range output and the delay set are continuously updated during viewing and display.

Pulse detector 52 is coupled to the detector output 51 for detecting the reception of a return pulse. The light from ordinary back scatter will be a decaying curve, and the return light 42 from the illuminated portion 40 of the target 30 will represent a sudden increase in the intensity of the light received by the detector 50.

The sample/hold module 53 is gated on and off at intervals; it is on to receive the return pulse. The timing/control module 55 receives outgoing pulse detect signal on line 66, conveys this information on detect line 59 to delay switch 56 which, after the appropriate, above-mentioned delay, signals trigger 54 to activate the sample/hold module 53. The interval set 60 input to the sample module 53 determines the amount of time the module is activated and therefore determines the depth-of-field "window" in which samples are taken. The sample interval can be adjusted to achieve optimal performance in a given viewing situation. The smaller the sample window, the higher the signal-to-noise ratio, assuming the pulse is received in the window. When the range to the target 30 is varying rapidly, the sample interval is increased accordingly to assure sampling of the return pulse.

The output signal 51 from the detector 50 is passed through signal conditioning electronics (not shown) where it is filtered and amplified. A high-pass filter removes the slowly varying components of the signal which are generated primarily by backscatter and an automatic gain control (AGC) amplifier maintains the amplitude of the output signal within relatively narrow limits. In the exemplary embodiment, the analog sample signal is converted to digital form by analog-to-digital converter 61 and transmitted to a video random access memory (RAM) 62, for storage and retrieval. Video RAM 62 is coupled to deflector position indication line 93. Therefore, each sample signal can be correlated to a given position. These digital signals sorted in the video RAM 62 are then read from the memory, converted back to analog form by the digital-to-analog converter 63 and are used to modulate the display, such as cathode ray tube (CRT) 64. Alternatively, the analog sample signal from the sample/hold module 53 may be directly converted to a video signal for display. Synchronizer 94, connected to the deflector position line 93 modulates the x-deflection and y-deflection of display 64 to display the current sample signal. When all of the signals are properly synchronized, the point-by-point intensity of the pattern display on the CRT 64 will be proportional to the point-by-point reflectance of the scanned portion of the target.

It can be seen that the system of the present invention provides an extremely effective method of viewing in turbid media. By creating a point-by-point, two-dimensional reflectance map of the target, the system relies on the propagation of luminous power rather than on the propagation of an image forming wavefront. This means that small-angle scattering, thermal variations, and other phase-modulating perturbations have a minimal effect on the quality of the final image. Also, the system is configured in a manner that minimizes the volume of water that is illuminated at any moment, thus minimizing the deleterious effects of back-scattering light. The coaxial path of the outgoing as well as the return light eliminates the focusing, ranging, and synchronization problems inherent in bistatic systems.

Although the invention is described primarily in terms of underwater viewing, this invention is not so restricted and may be used wherever the space between the target and the imaging system is contaminated by fog, blowing sand, or other suspended particulate matter that scatters light. Also, it is possible to create full color images by using a three-color source and three separate, filtered detectors.

In the claims, "beam splitter means" is defined to include any of several coaxial light source/receiving means such as a beam splitter, or a mirror with an orifice for the emitted light.

Although a particular embodiment of the invention has been illustrated and described, modifications and changes will become apparent to those skilled in the art, and it is intended to cover in the appended claims such modifications and changes as come within the true spirit and scope of the invention.

Having described my invention, I now claim:

1. A viewing system for use in turbid media comprising:
   light pulse emitting means for emitting a pulse of light;
   beam splitter means for receiving the emitted light pulse from the emitting means, for transmitting at least a portion of the emitted light received, and for deflecting a return reflected light pulse;
   controllable biaxial scanning means for receiving the transmitted light pulse from the beam splitter and directing the transmitted light pulse to a target to sequentially illuminate the target, for receiving the reflected light pulse from the target, and deflecting said reflected light pulse back to the beam splitter; and
   receiver means for receiving the reflected return light pulse after deflection from the beam splitter and for providing or producing a signal representative of the intensity of said light pulse.

2. The viewing system of claim 1 further comprising:
   means for focusing the emitted light pulse on a very small area of target.

3. The viewing system of claim 2 wherein the light pulse emitting means comprises:
   a laser as a light source; and
   switching means for creating a light pulse from said laser.

4. The viewing system of claim 3 wherein the switching means is a Q-switch.

5. The viewing system of claim 3 wherein the light pulse beam emitting means further comprises:
   a pulse generator for outputting a pulse signal to the switching means for activating the switching means.

6. The viewing system of claim 5 further comprising:
   clocking means coupled to the pulse generator for activating the pulse generator.

7. The viewing system of claim 2 wherein the scanning means comprises:
   an x-axis mirror; and
   a y-axis mirror.

8. The viewing system of claim 7 further comprising:
   an x-axis galvanometer, having a shaft upon which the x-axis mirror is mounted, for moving the x-axis mirror; and
   a y-axis galvanometer, having a shaft upon which the y-axis mirror is mounted, for moving the y-axis mirror; said y-axis galvanometer shaft being at a right angle to said x-axis galvanomter shaft.

9. The viewing system of claim 8 further comprising:
   drive means for said galvanometers such that the reflected transmitted beam describes a rectangular pattern.

10. The viewing system of claim 2 wherein the scanning means comprises:
    an x-axis motor having a rotatable shaft;
    a y-axis motor having a rotatable shaft at right angles to said x-axis motor shaft;
    a series of x-axis mirrors for mounting on said x-axis motor shaft; and
    a series of y-axis mirrors for mounting on said y-axis motor shaft.

11. A viewing system for use in turbid media comprising:
    light pulse emitting means for emitting a pulse of light;
    beam splitter means for receiving the emitted light pulse from the emitting means, for deflecting a portion of the emitted light pulse, for transmitting a portion of the emitted light pulse and for deflecting a return reflected light pulse;

controllably movable biaxial scanning means for receiving the transmitted light pulse from the beam splitter and directing the transmitted light pulse to a target to sequentially illuminate the target, for receiving the reflected light pulse from the target, and for deflecting said reflected light pulse back to the beam splitter; and receiver means for receiving the reflected light pulse after deflection from the beam splitter and for emitting a signal representative of the intensity of said return beam pulse.

12. The viewing system of claim 11 wherein the receiver means comprises:

a detector for receiving the reflected return light pulse after deflecting from the beam splitter and for outputting a signal representative of the light pulse intensity; and means coupled to the detector for sampling the output signal of the detector.

13. The viewing system of claim 11 further comprising:

timing means coupled to the sample means for activating the sample means upon the reception of each return light pulse by the detector.

14. The viewing system of claim 13 wherein the light pulse emitting means comprises:

a laser as a light source; and switching means for creating a light pulse from said laser.

15. The viewing system of claim 14 wherein the switching means is a Q-switch.

16. The viewing system of claim 14 wherein the light pulse beam emitting means further comprises:

a pulse generator for outputting a pulse signal to the switching means switch for activating the switching means.

17. The viewing system of claim 16 wherein the timing means comprises:

a sample trigger coupled to a delay unit and to the sample means for activating the sample means in response to a signal from the delay unit; and a delay unit of adjustable duration coupled to the output of the pulse generator into the sample trigger for detecting an output from the pulse generator and for signaling this detection to the sample trigger after a time delay of appropriate duration so that the sample means is only activated to receive that output signal from the detector that is representative of the return pulse intensity.

18. The viewing system of claim 12 wherein the timing means is activated by a detection of a portion of the outgoing pulse.

19. The viewing system of claim 12 wherein the timing means is activated by detection of a portion of the outgoing pulse that is deflected by the beam splitter.

* * * * *